(12) United States Patent
Morassut et al.

(10) Patent No.: US 9,750,090 B2
(45) Date of Patent: Aug. 29, 2017

(54) COOKING APPARATUS

(71) Applicant: Electrolux Professional S.p.A., Pordenone (IT)

(72) Inventors: Alessandro Morassut, Sacile (IT); Michele Simonato, Udine (IT)

(73) Assignee: Electrolux Professional S.p.A., Pordenone (IT)

( * ) Notice: Subject to any disclaimer, the term of this patent is extended or adjusted under 35 U.S.C. 154(b) by 24 days.

(21) Appl. No.: 14/875,821

(22) Filed: Oct. 6, 2015

(65) Prior Publication Data

US 2016/0100462 A1    Apr. 7, 2016

(30) Foreign Application Priority Data

Oct. 6, 2014    (EP) .................................. 14187741

(51) Int. Cl.
 *A47J 37/06*    (2006.01)
 *H05B 6/64*    (2006.01)
 (Continued)

(52) U.S. Cl.
 CPC .............. *H05B 6/647* (2013.01); *A21B 3/04* (2013.01); *A23L 5/10* (2016.08); *A23L 5/15* (2016.08);
 (Continued)

(58) Field of Classification Search
 CPC .......................... A23L 5/10; A23L 5/15; A47J 37/0611–2037/0617; A47J 37/0623–37/0629; A47J 37/0658; A47J 37/0676; A47J 2037/0795; A47J 37/049; A21B 3/04; F24C 15/2007; H05B 6/6458; H05B 6/645; H05B 6/647; H05B 2206/042
 (Continued)

(56) References Cited

U.S. PATENT DOCUMENTS 4,627,335 A    12/1986 Sherman et al.
5,065,889 A *  11/1991 Conti .................. A47G 19/027
                                                     220/360
(Continued)

FOREIGN PATENT DOCUMENTS

EP    1 020 153 A1    7/2000
FR    2957507 A1      9/2011
(Continued)

*Primary Examiner* — Drew Becker
(74) *Attorney, Agent, or Firm* — Pearne & Gordon, LLP

(57) ABSTRACT

A cooking apparatus (1) comprises a base (7) comprising a lower heater (2) defining a bottom cooking surface (4) where a foodstuff (F) to be cooked can be positioned; a cover (8) closable onto the base (7) and comprising an upper heater (3) defining a top cooking surface (5) and a lifting system (16) for moving the upper heater to and from the lower heater when the cover is closed onto the base; a database (103) storing a plurality of selectable cooking programs each including one or more cooking phases each associated with corresponding cooking parameters including a temperature of the upper heater and a distance (d) of the top cooking surface from the bottom cooking surface; and a controller (18) configured to control the operations of the lifting system and the upper heater based on the cooking parameters of a selected program.

15 Claims, 4 Drawing Sheets

(51) Int. Cl.
    *F24C 15/20*     (2006.01)
    *A23L 5/10*     (2016.01)
    *A21B 3/04*     (2006.01)
    *A47J 37/04*     (2006.01)
    *A23L 5/30*     (2016.01)
    *A47J 37/07*     (2006.01)

(52) U.S. Cl.
    CPC ............... A23L 5/34 (2016.08); A47J 37/049 (2013.01); A47J 37/0611 (2013.01); A47J 37/0676 (2013.01); F24C 15/2007 (2013.01); H05B 6/645 (2013.01); H05B 6/6458 (2013.01); *A23V 2002/00* (2013.01); *A47J 2037/0617* (2013.01); *A47J 2037/0795* (2013.01); *H05B 2206/04* (2013.01); *H05B 2206/042* (2013.01)

(58) Field of Classification Search
    USPC ........... 426/523, 233; 99/331, 333, 377–379, 99/389–392
    See application file for complete search history.

(56) References Cited

U.S. PATENT DOCUMENTS

| | | | | |
|---|---|---|---|---|
| 5,588,420 | A * | 12/1996 | Dickson | A47J 37/0704 126/25 R |
| 6,293,271 | B1 * | 9/2001 | Barbour | A47J 27/12 126/25 R |
| 7,449,665 | B2 * | 11/2008 | Fadelli | A47J 37/0611 219/680 |
| 7,499,665 | B2 | 3/2009 | Kuma et al. | |
| 2005/0193897 | A1 | 9/2005 | Nevarez et al. | |
| 2006/0254430 | A1 * | 11/2006 | Nevarez | A47J 27/62 99/349 |
| 2006/0289514 | A1 * | 12/2006 | Baumann | A47J 36/38 219/729 |
| 2007/0254078 | A1 * | 11/2007 | Calzada | A47J 37/0611 426/523 |
| 2009/0064869 | A1 | 3/2009 | Shealy et al. | |
| 2011/0062151 | A1 * | 3/2011 | Tassan-Mang-Ina | A47J 37/0611 219/690 |
| 2011/0132895 | A1 * | 6/2011 | Tassan-Mangina | A47J 37/0611 219/450.1 |
| 2013/0156917 | A1 * | 6/2013 | Cescot | A47J 37/00 426/510 |
| 2014/0220196 | A1 * | 8/2014 | Veloo | A23L 5/10 426/233 |
| 2014/0263285 | A1 * | 9/2014 | Tippmann | A47J 37/0611 219/620 |
| 2015/0108110 | A1 * | 4/2015 | Freymiller | A47J 37/0611 219/448.13 |
| 2015/0305554 | A1 * | 10/2015 | Dorsten | A47J 37/0611 426/233 |
| 2016/0220059 | A1 * | 8/2016 | Wachtler | A47J 36/32 |

FOREIGN PATENT DOCUMENTS

| | | |
|---|---|---|
| WO | 2007/044330 A2 | 4/2007 |
| WO | 2007/127072 A2 | 11/2007 |
| WO | 2011/159754 A1 | 12/2011 |

* cited by examiner

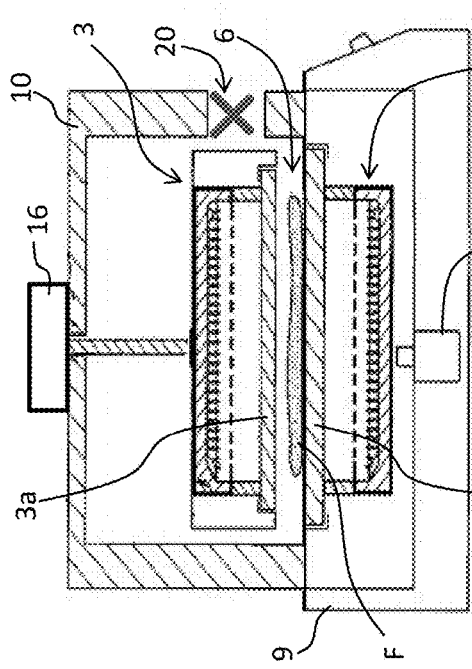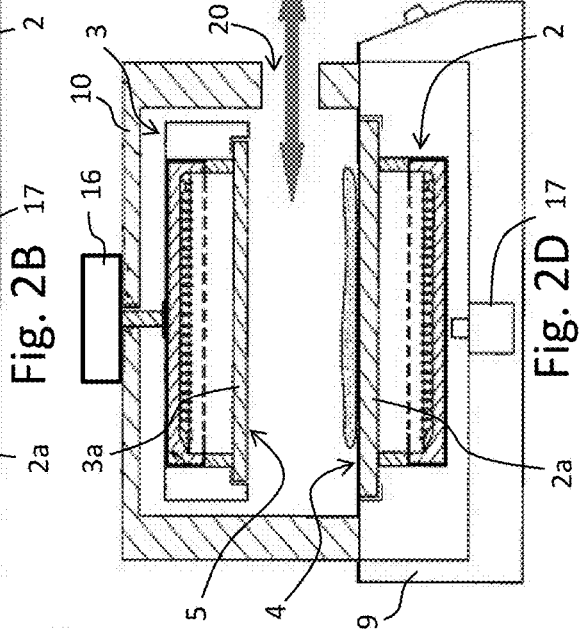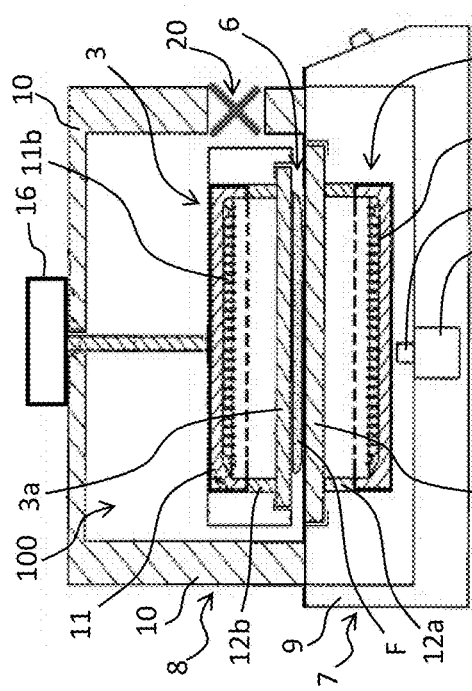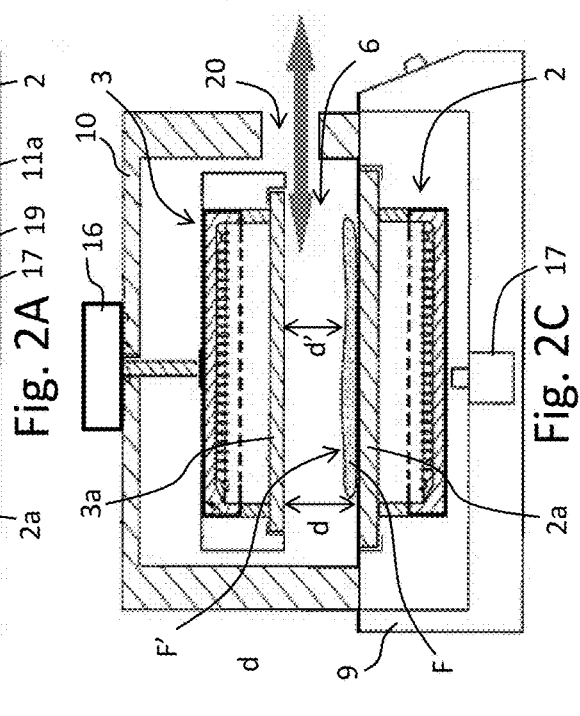

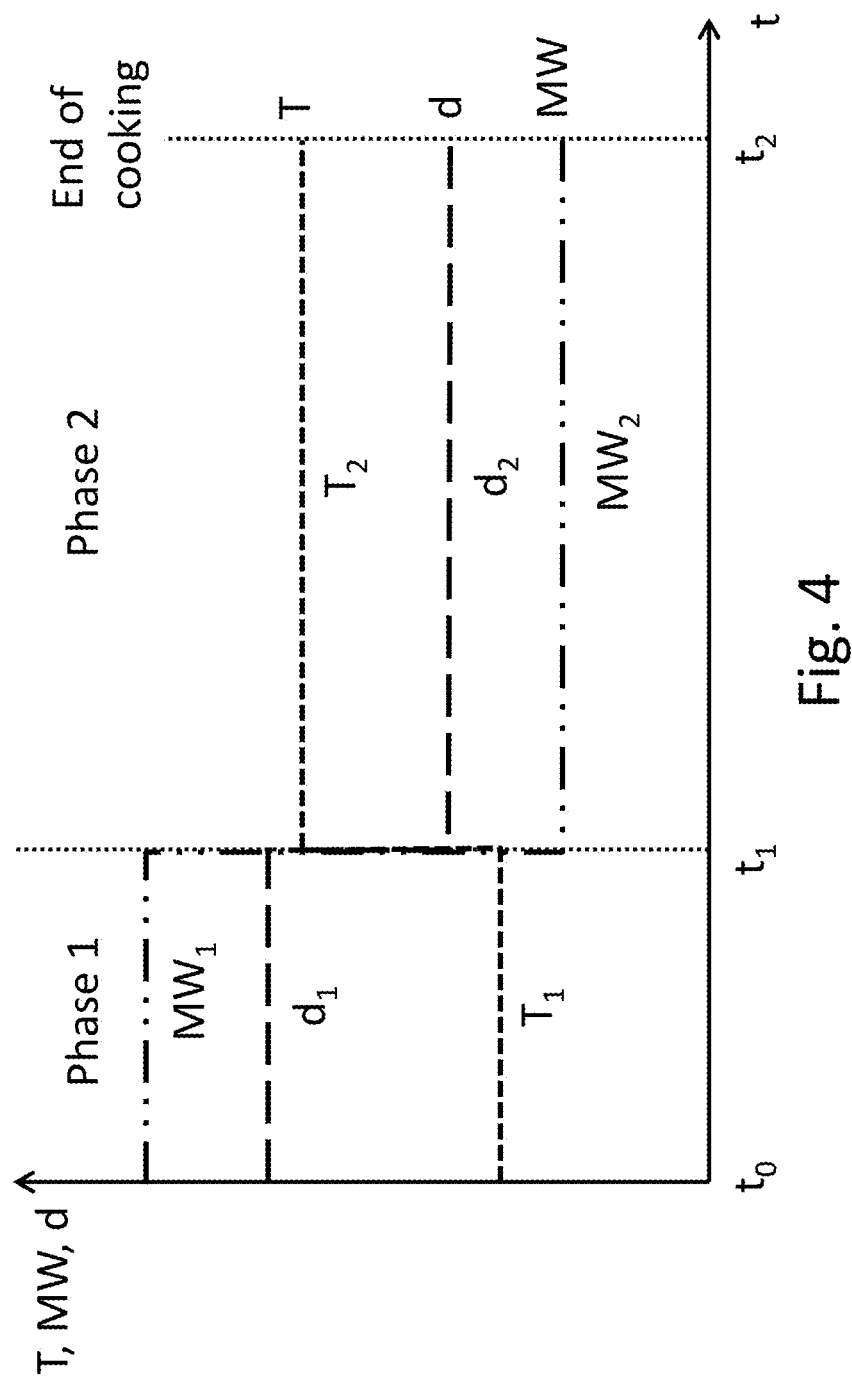

COOKING APPARATUS

FIELD OF THE INVENTION

The present invention relates to a cooking apparatus in general and more particularly to a cooking apparatus of the type including a lower and upper juxtaposed cooking heating assembly having a respective top and bottom cooking surfaces separated by an adjustable gap.

BACKGROUND OF THE INVENTION

Cooking apparatuses having a lower and upper juxtaposed cooking heating assembly with a respective top and bottom cooking surface are well known in the art.

U.S. Pat. No. 7,499,665, to the same applicant, discloses a cooking apparatus including a microwave generator and juxtaposed cooking plates or platen assemblies. The upper cooking plate is urged by its own mass toward the lower cooking plate. Adjustable stop means for adjusting the minimum gap between the plates are provided. This device is intended for combining the use of microwaves and contact cooking in order to fast cook and grill sandwiches and hamburgers. When a microwave cooking is programmed as an initial cooking step, the bread or dough part of the sandwich is softened by heat and steam and might be undesirably compressed (flattened) by the upper plate.

US 2009/064869 discloses a grill having two upper and two lower heating members, each including a heating device and a grill. The grills are brought into contact with the food and the gap there between can be adjusted while starting cooking. The upper heating members can be raised in order to allow cooking with just the lower heating. Contact cooking is the sole contemplated possibility. Microwave additional cooking is mentioned just as a generic addition.

WO 2011/159754 discloses a cooking device in which the food is placed in plastic bags and forced between two vertically oriented heated plates for cooking. The plates are movable toward and away from each other in order to bring them in appropriate contact with the food. At the end of the cooking cycle the food is maintained between the plates while the gap there between is widened in order to keep the food at an appropriate serving temperature.

WO 2007/044330 discloses a grill having opposed upper and lower platens wherein a gap spacing between the platens is adjusted in an initial stage and in subsequent stages of the cooking time. The food is placed between two opposed cooking surfaces defining a gap spacing there between that is adjustable so that during an initial stage of the cooking the gap spacing is equal to or less than the nominal initial uncooked thickness of the food, and during one or more subsequent stages of the cooking, after the initial stage, the gap spacing between the platens is varied. Thermostatic control of the cooking surfaces is unchanged when gap spacing is varied. The device is intended for contact cooking.

WO 2007/127072 discloses a dual-sided cooking device wherein upper and lower cooking platens are positioned parallel to each other when in a cooking position. Steam evacuation is permitted but contact between the food and the platens is essential to perform all cooking steps.

U.S. Pat. No. 4,627,335 discloses an apparatus for cooking food including two juxtaposed plates between which the food is initially subjected to high heat and pressure, and the pressure is adjusted in dependence upon the nature of the food material by an adjusting device. Contact cooking is an essential part of the device.

EP 1020153 discloses a clamshell cooking apparatus having upper and lower platen movable between a non-cook and a cook position. In the cook position, the upper platen is in contact with the foodstuff and is separated from the lower platen by a gap depending on the thickness of the foodstuff. To this end, the cooking apparatus comprises a gap sensor assembly disposed to determine when the upper cooking platen assembly contacts the foodstuff. The gap can be electronically adjusted by a motive device for various thicknesses of foodstuffs in order to maintain an appropriate cooking pressure on the food. A control circuit stops the motive device when the sensor indicates that the upper cooking plate is contacting the foodstuff. Once the motive device is stopped, the control circuit determines the gap size, and according to this, also determines a cooking time for the apparatus. Control circuit could also select a cooking temperature in response to the gap size.

US 2005/0193897 discloses a cooking device rather similar to EP 1020153. Platen position can be adjusted in order to maintain an appropriate cooking pressure on the foodstuff to be cooked.

FR 2957507 discloses a salamander broiler having an adjustable upper grill. No lower heating plate is provided.

SUMMARY OF THE INVENTION

An object of this invention is to provide a cooking apparatus that overcomes the drawbacks of cooking apparatuses comprising a lower and an upper cooking surface, in particular the drawbacks of cooking apparatuses designed for contact cooking of foodstuff. These apparatuses for example are not suitable for cooking foodstuff that can be deteriorated or damaged by contact with a heated plate.

Another object is to provide a cooking apparatus which is versatile and efficient in term of cooking time, energy consumption and cooking quality.

Another object of the invention is to provide a cooking apparatus which becomes less dirty during cooking of foodstuff. To this regard, it should be noted that, typically, in order to cook foodstuff such sandwiches, the cooking surfaces are required to contact the foodstuff for a longer time than the one required for making the outer surface optimally crusty, in order to well cook and/or melt the internal part, comprising for example cheese. As a consequence, often the outer surface burns and the cooking surfaces become dirty without improving the cooking quality.

The present invention thus relates to a cooking apparatus comprising:
  a base comprising a lower heater defining a bottom cooking surface where a foodstuff to be cooked can be positioned,
  a cover closable onto the base and comprising an upper heater defining a top cooking surface, the cover further comprising a lifting system for moving the upper heater to and from the lower heater when the cover is closed onto the base,
  a database storing a plurality of selectable cooking programs each including one or more cooking phases, wherein each cooking phase is associated with corresponding cooking parameters including a temperature of the upper heater and a distance of the top cooking surface from the bottom cooking surface, and
  a controller configured to control the operations of the lifting system and the upper heater based on the cooking parameters of a selected program.

Preferably, at least one of said cooking programs includes at least two different cooking phases.

More preferably, each cooking program is associated with an expected foodstuff thickness and at least one of the cooking programs includes at least one non-contact cooking phase where the distance of the top cooking surface from the bottom cooking surface is higher than the expected foodstuff thickness and one contact cooking phase where the distance of the top cooking surface from the bottom cooking surface is equal or lower than the expected foodstuff thickness.

In a preferred embodiment, the base and the cover respectively comprise a lower and an upper shell that define a closed or closable chamber when the cover is closed onto the base, the lower and upper shells respectively carrying the lower and upper heaters, which are located inside the chamber when the cover is closed onto the base.

Advantageously, the apparatus may further comprise an adjustable valve for venting a cooking space between the bottom and top cooking surfaces.

In such case, the controller is preferably configured to control the adjustable valve as a function of the distance of the top cooking surface from the bottom cooking surface.

The adjustable valve preferably comprises a through hole formed in the cover, such hole being subject to selective interception by the upper heater while moving to and from the lower heater.

The apparatus may further comprise a humidity sensor connected to the controller in order to selectively open and close the adjustable valve according to a humidity value detected.

In a possible embodiment, the apparatus further comprises a microwave generator adapted to direct microwaves onto the foodstuff when the foodstuff is positioned on the bottom cooking surface.

In such case, the cooking parameters preferably comprise a microwave power generated by the microwave generator and the controller is preferably configured to control the operations of the microwave generator based on the values of said microwave power.

The present invention also relates to a method for cooking foodstuff in a cooking apparatus comprising a lower heater and an upper heater, comprising:
  storing a plurality of selectable cooking programs each including one or more cooking phases, wherein each cooking phase is associated with corresponding cooking parameters including a temperature of the upper heater and a distance of the upper heater from the lower heater,
  positioning a foodstuff on the lower heater,
  selecting a cooking program among said stored cooking programs, and
  controlling the temperature of the upper heater and the distance of the upper heater from the lower heater based on the cooking parameters of the selected cooking program.

The upper heater preferably includes a heating element and the step of controlling the temperature of the upper heater includes the step of controlling the temperature of the heating element.

The method may further include the step of venting the cooking space as a function of the distance of the upper heater from the lower heater.

In a possible embodiment, the cooking apparatus further comprises a microwave generator and the cooking parameters further comprise a microwave power generated by the microwave generator, the method further including controlling the microwave generator based on said microwave power.

BRIEF DESCRIPTION OF THE DRAWINGS

Further features and advantages of the present invention will become apparent from the following detailed description of an example thereof given by way of example with reference to the appended drawings in which:
FIGS. 2A-D are side views, with parts in section and parts removed for clarity, of the cooking apparatus of FIG. 1 in different operative conditions;
FIG. 4 is an example of a cooking program that can be run by the cooking apparatus of the present invention.

DETAILED DESCRIPTION OF THE INVENTION

Figure 1:
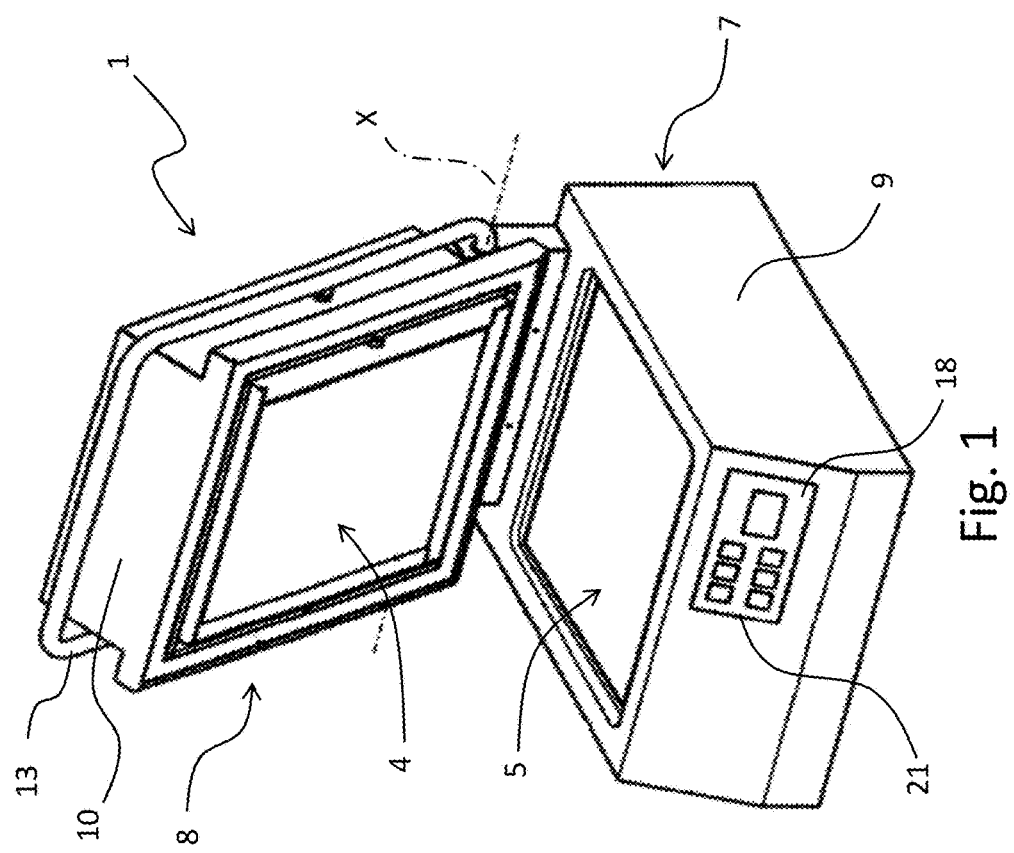
FIG. 1 is a perspective view, with parts removed for clarity, of the cooking apparatus of the present invention.

With reference initially to FIG. 1, a cooking apparatus according to the invention is generally indicated with the reference number 1. The apparatus 1 comprises a base 7 and a cover 8 closable onto the base 7. In particular, the base 7 comprises a lower shell 9 and the cover 8 comprises an upper shell 10, the upper shell 10 being closable onto the lower shell 9, i.e. being movable relatively to the lower shell 9 from an open position (or rest position) as shown in FIG. 1 to a closed position (or operative position) as shown in FIGS. 2A-D wherein the upper shell 10 rests onto the lower shell, so as to define a closed or closable chamber 100 there-between. Accordingly, a closed cooking environment can be obtained in a simple manner, thus providing optimal cooking performances.

In the preferred embodiment illustrated in FIG. 1, the upper shell 10 is hinged to the lower shell 9 about a rotation axis X and is provided with a handle 13, so that it can be manually rotated between the open position and the closed position.

The base 7 and the cover 8 comprise respective lower and upper heaters, or heating assemblies 2, 3, which are located inside the chamber 100 when the cover 8 is closed onto the base 7 and define respective bottom and top cooking surfaces 4, 5 (see FIG. 2D). In the particular embodiment here disclosed, heating assemblies 2, 3 are cooking platen assemblies, including respective lower and upper heating platens 2a, 3a that are juxtaposed when the cover 8 is closed onto the base 7 and define said cooking surfaces 4, 5. According to a preferred embodiment, the bottom and top cooking surfaces 4, 5 are treated with a non-stick coating in order to prevent portions of foodstuff to adhere to them.

The two heating platen 2a, 3a may be made both of a metal, preferably aluminium. Alternatively, since the apparatus 1 may be provided—as described below—with at least one microwave generator, at least one of the two heating platens, in particular the one(s) interposed between the microwave generator(s) and the food, are preferably made of a material transparent to microwaves, such as quartz. In the embodiment herein described and illustrated, the lower heating platen 2a is made of quartz and the upper heating platen 3a is made of aluminium.

The heating assemblies 2 and 3 are contained and supported in the lower and upper shells 9, 10, respectively, so that the upper heating assembly 3 is movable together with the respective upper shell 10 from an open (or rest) position as shown in FIG. 1, in which it is spaced from the lower heating assembly 2, to a closed (or operative) position as shown in FIGS. 2A-D, where it faces the lower heating assembly 2 and where the top cooking surface 5 forms with the bottom cooking surface 4 an adjustable gap 6 defining a cooking space (or cooking environment). Unless otherwise specifically indicated in the following description, reference will be made to the respective parts as appearing in the closed (operative) position of said shells 9, 10.

The lower and upper heating assemblies 2, 3 include respective casings (or support bodies) 12a, 12b containing respective heating elements 11a, 11b, such as electric resistors. Preferably, the lower and upper cooking platens 2a, 3a are mounted on the casing 12a, 12b of the respective heating assembly 2, 3.

Heating assemblies 2, 3 are also provided with an independent thermostatic control, which acts on the respective heating element 11a, 11b and which is set and adjusted by a controller 18. As schematically shown in FIG. 1, the controller 18 may be associated with a user interface 21 (which can be a touch screen, a keypad or similar), but alternatively it can be placed in another part of the base 7 and be connected in some way to the user interface 21. Thanks to the controller 18 it is therefore possible to control the temperature at the cooking surface 4, 5 of the heating assemblies 2, 3.

Preferably, the base 7 further comprises one or more microwave generators 17 (only one being represented) housed in the lower shell 9 and one or more wave guides 19 directing the microwaves to the cooking space defined within the gap 6. The microwave generators 17 are also connected the controller 18 for setting and control of their operations.

Microwave generators 17 are additional cooking means with respect to the lower and upper heating assemblies 2, 3 and integrate the cooking action of the lower and upper heating assemblies 2, 3 by a microwave-type cooking, which is more effective in cooking the core of the foodstuff, thus allowing a reduction of cooking time and avoiding uneven cooking.

The cover 8 further comprises a lifting device 16, preferably including an electromechanical linear actuator, connected to the upper heating assembly 3, as schematically shown in FIGS. 2A-2D, for displacing—along a vertical direction—the upper heating assembly 3 relatively to the upper shell 10, when the latter is closed onto the lower shell 9. In particular, the lifting device 16 is designed to move the upper heating assembly 3 towards and away from the lower heating assembly 2, in order to adjust the gap 6, i.e. the distance d (see FIG. 2C) of the upper heating assembly 3 (in particular, of the top cooking surface 5) from the lower heating assembly 2 (in particular, from the bottom cooking surface 4). In particular, the upper heating assembly 3 can be moved between a fully raised position and a fully lowered position, wherein the distance d (i.e. the gap 6) is respectively maximized and minimized. The distance d' (see FIG. 2C) between the top cooking surface 5 and an upper surface F' of the foodstuff positioned on the bottom cooking surface 4 is varied accordingly, as shown in FIG. 2C. The position of the upper heating assembly 3 is chosen and possibly varied during the various cooking steps of a foodstuff as will be explained hereafter.

The cooking apparatus 1 may further comprise a device (not shown) for detecting the distance d between the two heating assemblies 2, 3, more precisely between the two cooking surfaces 4, 5, in order for example to provide a feedback signal to the lifting device 16. Such distance detecting device may for example comprise a laser distance sensor fixed to the top cooking surface 5 and directing a laser beam towards the bottom cooking surface 4.

In addition or in alternative, the cooking apparatus 1 may comprise a device (not shown) for detecting, directly or indirectly, the cooking distance d' between the top cooking surface 5 and the upper surface F' of the foodstuff F. For example, the distance d' can be obtained by measuring the distance d between the top and bottom cooking surfaces 4, 5 as explained above, and then subtracting the thickness of the foodstuff F, which, as described later on, is an information that can be associated in advance to each selectable cooking program. In particular, each selectable cooking program can be associated with a predefined (or expected) thickness of the foodstuff F, which can be for example an average thickness of the foodstuff F (e.g. a frozen pizza cooking program can be associated with a foodstuff thickness of 2 cm). Accordingly, in this case the distance d' is not directly detected but it is calculated indirectly by means of the controller 18.

Still with reference to FIGS. 2A-D, one or more through hole(s) 20 is (are) provided in the upper shell 10 to allow the cooking space (within gap 6) to communicate with the outside of the apparatus 1 (i.e. the external environment) in order to control venting of the cooking space and, therefore, to control emission of steam and/or smoke therefrom. Hole 20 can be screened (i.e. the air flow intercepted) fully or in part by the upper heating assembly 3 when this is in its lower position or when this is moved by the lifting device 16 to adjust the distance d between the cooking surfaces 4, 5, thereby allowing a further adjustment of the cooking parameters (in particular relative humidity) in the cooking space. In this manner, the assembly formed by hole 20 and upper heating assembly 3 defines an adjustable valve capable of controlling venting of the cooking space, i.e. to selectively allow the evacuation of steam and smoke from the cooking chamber when required, for example during contactless cooking.

Operations of valve 20 can therefore be controlled by the controller 18 as a function of the distance d between the cooking surfaces 4, 5. This allows for example retaining steam and increasing humidity of the cooking environment during a cooking stage where it is important to prevent an excessive drying of the foodstuff, and discharging steam outside in a following cooking stage where the surface of the foodstuff is grilled to become crispy and crunchy.

According to an alternative embodiment, not shown in the figures, the cooking apparatus further comprises a humidity sensor placed inside the cooking space and connected to the controller 18 in order to selectively open and close the adjustable valve 20 according to the humidity detected. In this manner, it is possible to control the amount of vapour in the cooking space.

According to the above, when a foodstuff F is placed in the cooking space, at least the following cooking conditions (functions) are possible depending on the lifting position of the upper heating assembly 3:

a) Top cooking surface 5 contacting foodstuff F and steam evacuation blocked (FIG. 2A);
b) Top cooking surface 5 not contacting foodstuff F and steam evacuation blocked (FIG. 2B);
c) Top cooking surface 5 not contacting foodstuff F and steam evacuation partially allowed (FIG. 2C);
d) Top cooking surface 5 not contacting foodstuff F and steam evacuation allowed (FIG. 2D).

During function a) the foodstuff is in direct contact with cooking surfaces 4, 5 and the hole 20 is entirely screened (i.e. the air flow fully intercepted).

During function b) the top cooking surface 5 is spaced apart from the foodstuff F (minimum distance of distant cooking) and the hole 20 is entirely screened (i.e. the air flow fully intercepted).

During function c) the top cooking surface 5 is spaced apart from the foodstuff F (distant cooking) and the hole 20 is partially open and partially screened (i.e. the air flow partially intercepted).

During function d) the top cooking surface 5 is spaced apart from the foodstuff F (distant cooking) and the hole 20 is fully open (no interception of the air flow by the upper heating assembly 3).

Figure 3:
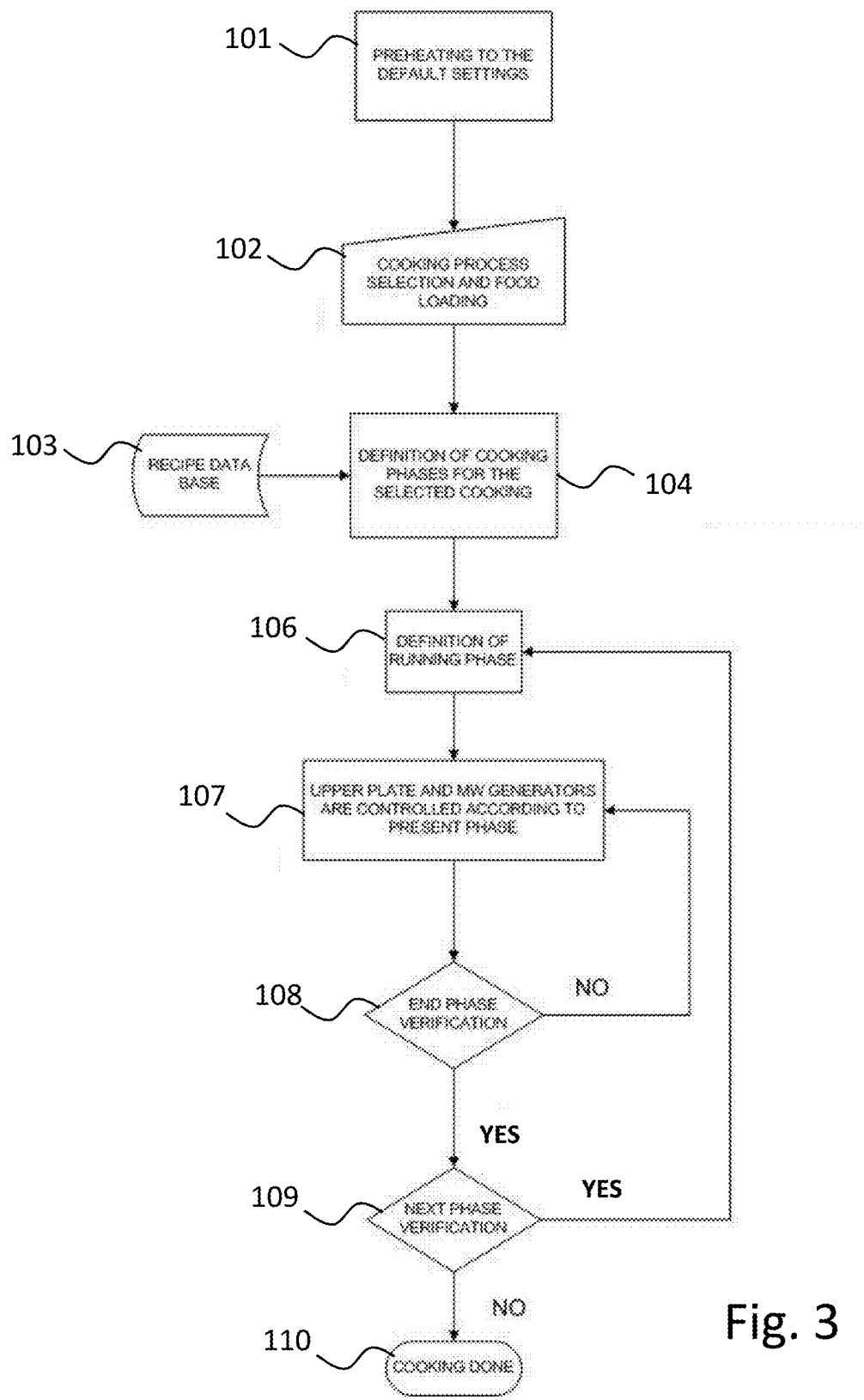
FIG. 3 is a flow chart depicting a method for cooking foodstuff with the cooking apparatus of the present invention.

With reference to FIG. 3, a method for cooking foodstuff with the cooking apparatus of the present invention is depicted in the form of a flow chart.

The initial step 101, which is carried out whenever the cooking apparatus 1 is turned on, is a pre-heating of the lower and upper heating assemblies 2, 3 to a default initial setting. In particular, the lower heating assembly 2 is heated to a predetermined temperature that is then preferably kept constant during the cooking program. Moreover, the upper heating assembly 3 is positioned by the lifting device 16 at a maximum distance from the lower heating assembly 2.

At step 102 the user selects, by means of user interface 21, the desired cooking program, corresponding either to a receipt or a cooking process. Foodstuff F is loaded (before or after the program selection) in the cooking space of the apparatus, by positioning it on the bottom cooking surface 4.

Reference 103 identifies a database which contains information on a plurality of selectable cooking programs and corresponding sequences of cooking phases, wherein each cooking phase is identified by (or associated with) the following cooking parameters:
- the vertical position of the upper heating assembly 3, i.e. the distance d of the upper heating assembly 3 (in particular of the top cooking surface 5) from the lower heating assembly 2 (in particular from the bottom cooking surface 4),
- the temperature T of the upper heating assembly 3, and
- in case microwave generating elements 17 are provided, the microwave energy MW supplied, preferably by adjustment of the magnetron duty cycle.

Here and below, with "cooking phase" it will be understood a cooking time interval in which the above cooking parameters are not varied. This time interval can be very short, e.g. of the order of one second (and may correspond to the timing of the clock of the electronic board), or relatively long, e.g. some minutes.

Therefore, each selectable cooking program defines the time evolution of the above-mentioned parameters, and includes one or more cooking phases, wherein said parameters are substantially constant.

The cooking programs can be loaded in the database 103 by the producer when the apparatus is set. Alternatively or in addition, the database 103 may be populated or updated by a user by means of the user interface 21.

In a possible embodiment, the apparatus 1 may be set so as to have a predefined relation between the distance d and the temperature T, for example a linear relation like $T = a \cdot d$ (where a is a constant), so that the cooking program could specify only one of the two parameters and the other would be automatically adjusted based on such relation.

As previously mentioned, there can be a device for detecting the distance d between the two cooking surfaces 4, 5, which device can be used for providing a feedback to the controller 18 for operating the lifting system 16 and the upper heating assembly 3. In particular, the temperature of the upper heater element 11b can be regulated according to the distance d.

In any case, also in the embodiment in which the distance d and the temperature T are linked by a predefined function, each single cooking phase would be associated with a corresponding couple of values of the distance d and the temperature T (as well as to a value of microwave energy MW, if microwave cooking is included in the cooking phase).

Preferably, at least one of the cooking programs comprises two or more different cooking phases. More preferably, there will be a plurality of cooking programs each comprising a plurality of different cooking phases. Moreover, at least one cooking program will preferably have at least one non-contact cooking phase, i.e. a cooking phase where the top cooking surface 5 is not in contact with the foodstuff F. More preferably, at least one cooking program will have at least one non-contact cooking phase, i.e. a cooking phase where the top cooking surface 5 is not in contact with the foodstuff F, and at least one contact cooking phase, i.e. a cooking phase where the top cooking surface 5 is in contact with the foodstuff F. In a possible embodiment, there are a plurality of cooking programs, each of which comprises a plurality of cooking phases including at least one contact cooking phase and one non-contact cooking phase.

As an example, the program for cooking a generic sandwich may include a sequence of two cooking phases, namely: a first cooking phase in which the temperature at each cooking surface 4, 5 is set at 230° C., the upper heating assembly 3 is fully risen and the microwave generators 17 are switched-on to have microwave cooking at 900 W for 1 minute; and a second cooking phase immediately subsequent to the first wherein the microwave generators 17 are switched-off, the temperature at the bottom cooking surface 4 is kept at 230°, the temperature of the top cooking surface 5 is increased to 250° C. and the top cooking surface 5 is positioned in contact with the foodstuff F (or in a position that is expected to be in contact with the foodstuff F) for 2 minutes. The total cooking phase lasts therefore 3 minutes and is organized in two cooking phases.

This possibility of setting contact and non-contact cooking phases in a same cooking program allows for example to prevent flattening of the sandwich by controlling the position of the upper cooking surface 5 through a control of the lifting system 16 by controller 18, in order to apply to the sandwich the minimum load requested for contact cooking until the sandwich surface is crisped to satisfaction and then lifting the upper cooking surface to a distant cooking position for completing the sandwich cooking.

The cooking apparatus 1 is in that sense very flexible: the database 103 can be populated (or updated at whatever moment) with a number of cooking programs that are considered as the most efficient or the most desirable for the particular use of the apparatus (for example, for domestic use or for use in bars or professional kitchen), and any cooking program may contain the desired sequence of non-contact cooking phases and/or contact cooking phases.

FIG. 4 is an illustrative example of a cooking program that can be loaded in the database 103. This cooking program includes two cooking phases: a first cooking phase (Phase 1) starting at time $t_0$ and ending at time $t_1$ and identified by a distance $d_1$, a temperature $T_1$ and a microwave energy $MW_1$, and a second cooking phase (Phase 2) starting at time $t_1$ and ending at time $t_2$ and identified by a distance $d_2$ lower than $d_1$, a temperature $T_2$ higher than $T_1$ and a microwave energy $MW_2$ lower than $WM_1$. This cooking program would be suitable for example for cooking of a particular foodstuff having an expected (or average) thickness equal to $d_2$, so that the first phase would be a non-contact cooking phase and the second phase would be a contact cooking phase.

At step 104 of the flowchart of FIG. 3, the apparatus 1, in particular the controller 18, determines from database 103 the sequence of phases, in particular the values in time of the position and temperature of the upper heating assembly 3 as well as the possible operation of the microwave generator 17, related to the selected cooking program.

At step 106, the controller 18 identifies, within the sequence of phases of the selected cooking program, the next phase to execute (the first phase, if the cooking process has just started) and loads it as running phase (or present phase).

At step 107 the controller 18 executes the running phase by controlling operations of the lifting device 16, of the upper heating assembly 3 and possibly of the microwave generator 17, for regulating respectively the distance d of the upper heating assembly 3 from the lower heating assembly 2, the temperature T of the upper heating assembly 3 and the microwave power MW, in accordance with the specification of the running cooking phase.

At step 108, the controller 18 checks if according to the selected cooking program the running phase ended, for example because the cooking parameters are varying so that a new cooking phase is starting. In the affirmative, the process proceeds with step 109, otherwise steps 107 and 108 are repeated and the current cooking phase continued.

At step 109, the controller 18 checks if the selected cooking program includes a cooking phase subsequent to the one just ended. In the affirmative, the cooking process moves back to step 106, where the controller 18 identifies this subsequent phase as running phase, which is then executed in step 107. Differently, still in step 109, if no further phase is contemplated (for example because the total time of the cooking program measured by a timer is over), at step 110 the apparatus communicates to the user, by means of proper indications on the user interface 21, that the cooking process is over.

It may be easily understood that the cooking apparatus according to the present invention allows optimal cooking performances since contact and contactless cooking stages can be alternated while keeping the heat reverberated onto the food constant or, in any case, controlled.

In this manner even foodstuff requiring a delicate cooking, such as soft sandwiches, pizza, meat in which it is often desirable to have a crusty outer surface with a soft and well-cooked internal part, can be optimally cooked.

Furthermore, the cooking apparatus according to the invention is particularly versatile, since the user can set and select cooking programs that easily switch between a contact cooking and a contactless one and obtain faster or slower cooking and crispier or less crispy cooking accordingly.

The structure and operation of the cooking apparatus according to the invention allows better prevention of food sticking to, and burning against, the upper cooking surface, thereby allowing easier cleaning of the cooking surfaces which are not contaminated by burnt stuck food portions that need to be removed by abrasion.

The invention furthermore allows for easy saving of energy. By optimizing the cooking process through an alternation of different cooking phases, less heat is wasted for unnecessary or excessive heating of the cooking surfaces. The cooking surfaces are heated only when this is necessary according to specific cooking programs and receipts. Furthermore, the saving of energy is also obtained by the capability of reducing the gap between the cooking surface, since in this manner the dimension of the cooking environment can be minimized in relation to the cooking program.

The invention claimed is:

1. A cooking apparatus (1) comprising:
    a base (7) comprising a lower heater (2) defining a bottom cooking surface (4) where a foodstuff (F) to be cooked can be positioned,
    a cover (8) closable onto the base (7) and comprising an upper heater (3) defining a top cooking surface (5), the cover (8) further comprising a lifting system (16) for moving the upper heater (3) to and from the lower heater (2) when the cover (8) is closed onto the base (7),
    an adjustable valve for venting a cooking space between the bottom and top cooking surfaces (4, 5), said adjustable valve comprising a through hole (20) formed in said cover (8),
    a database (103) storing a plurality of selectable cooking programs each including one or more cooking phases, wherein each cooking phase is associated with corresponding cooking parameters including a temperature of the upper heater (3) and a distance (d) of the top cooking surface (5) from the bottom cooking surface (4), and
    a controller (18) configured to control the operations of the lifting system (16) and the upper heater (3) based on the cooking parameters associated with a selected program.

2. The cooking apparatus according to claim 1, wherein at least one of said cooking programs includes at least two different cooking phases.

3. The cooking apparatus according to claim 1, wherein each cooking program is associated with an expected foodstuff thickness and wherein at least one of said cooking programs includes at least one non-contact cooking phase where the distance (d) of the top cooking surface (5) from the bottom cooking surface (4) is higher than the expected foodstuff thickness and one contact cooking phase where the distance (d) of the top cooking surface (5) from the bottom cooking surface (4) is equal or lower than the expected foodstuff thickness.

4. The cooking apparatus according to claim 1, wherein the base (7) and the cover (8) respectively comprise a lower and an upper shell (9, 10) that define a closed or closable chamber (100) when the cover (8) is closed onto the base (7), the lower and upper shells (9, 10) respectively carrying the lower and upper heaters (2, 3), which are located inside the chamber (100) when the cover (8) is closed onto the base (7).

5. The cooking apparatus according to claim 4, wherein the upper shell (10) encloses the upper heater (3), the through hole (20) is formed in said upper shell (10), and the through hole (20) is configured to be opened and closed fully or in part by the upper heater (3).

6. The cooking apparatus according to claim 1, wherein the controller (18) is configured to control the adjustable valve as a function of said distance (d) of the top cooking surface (5) from the bottom cooking surface (4).

7. The cooking apparatus according to claim 1, wherein the hole (20) is subject to selective interception by the upper heater (3) while moving to and from the lower heater (2).

8. The cooking apparatus according to claim 1, further comprising a humidity sensor connected to said controller (18) in order to selectively open and close said adjustable valve according to a humidity value detected.

9. The cooking apparatus according to claim 1, further comprising a microwave generator (17) adapted to direct microwaves onto said foodstuff when positioned on said bottom cooking surface (4).

10. The cooking apparatus of claim 9, wherein said cooking parameters comprise a microwave power and said controller (18) is configured to control the operations of the microwave generator (7) based on the values of said microwave power.

11. A method for cooking foodstuff in a cooking apparatus comprising a lower heater and an upper heater, comprising:
storing a plurality of selectable cooking programs each including one or more cooking phases, wherein each cooking phase is associated with corresponding cooking parameters including a temperature of the upper heater and a distance of the upper heater from the lower heater,
positioning a foodstuff on the lower heater,
selecting a cooking program among said stored cooking programs,
venting a cooking space between the upper heater and the lower heater by selectively closing fully or in part an adjustable valve comprising a through hole formed in a cover of the cooking apparatus,
controlling the temperature of the upper heater and the distance of the upper heater from the lower heater based on the cooking parameters associated with the selected cooking program.

12. The method for cooking foodstuff according to claim 11, wherein the upper heater includes a heating element and controlling the temperature of the upper heater includes controlling the temperature of the heating element.

13. The method for cooking foodstuff according to claim 11, wherein the venting the cooking space is a function of said distance of the upper heater from the lower heater.

14. The method for cooking foodstuff according to claim 11, wherein said cooking apparatus further comprises a microwave generator and said cooking parameters further comprise a microwave power generated by said microwave generator, the method further including controlling the microwave generator based on said microwave power.

15. A cooking apparatus (1) comprising:
a base (7) comprising a lower heater (2) defining a bottom cooking surface (4) where a foodstuff (F) to be cooked can be positioned;
a cover (8) closable onto the base (7) and comprising an upper heater (3) defining a top cooking surface (5) and a lifting system (16) for moving the upper heater (3) to and from the lower heater (2) when the cover (8) is closed onto the base (7),
a database (103) storing a plurality of selectable cooking programs each including one or more cooking phases, wherein each cooking phase is associated with corresponding cooking parameters including a temperature of the upper heater (3) and a distance (d) of the top cooking surface (5) from the bottom cooking surface (4),
a controller (18) configured to control the operations of the lifting system (16) and the upper heater (3) based on the cooking parameters associated with a selected program;
an adjustable valve for venting a cooking space between the bottom and top cooking surfaces (4, 5); and
a humidity sensor connected to the controller (18) in order to selectively open and close the adjustable valve according to a humidity value detected.

\* \* \* \* \*